June 11, 1963 M. E. KROM 3,093,708

TELEPHONE LINE CONCENTRATOR SYSTEM

Filed March 29, 1961 9 Sheets-Sheet 1

INVENTOR
M. E. KROM
BY
S E Hollander
ATTORNEY

June 11, 1963

M. E. KROM 3,093,708

TELEPHONE LINE CONCENTRATOR SYSTEM

Filed March 29, 1961

9 Sheets-Sheet 2

INVENTOR
M. E. KROM

BY S E Hollander

ATTORNEY

June 11, 1963 M. E. KROM 3,093,708

TELEPHONE LINE CONCENTRATOR SYSTEM

Filed March 29, 1961 9 Sheets-Sheet 3

INVENTOR
M. E. KROM
BY S E Hollander
ATTORNEY

June 11, 1963 M. E. KROM 3,093,708

TELEPHONE LINE CONCENTRATOR SYSTEM

Filed March 29, 1961 9 Sheets-Sheet 4

INVENTOR
M. E. KROM
BY
SE Hollander
ATTORNEY

June 11, 1963 M. E. KROM 3,093,708

TELEPHONE LINE CONCENTRATOR SYSTEM

Filed March 29, 1961 9 Sheets-Sheet 5

INVENTOR
M. E. KROM
BY
S E Hollander
ATTORNEY

TELEPHONE LINE CONCENTRATOR SYSTEM

Filed March 29, 1961

INVENTOR
M. E. KROM
BY
SE Hollander
ATTORNEY

TELEPHONE LINE CONCENTRATOR SYSTEM

Filed March 29, 1961 9 Sheets-Sheet 7

INVENTOR
M. E. KROM
BY
S E Hollander
ATTORNEY

INVENTOR
M. E. KROM
BY
S E Hollander
ATTORNEY

INVENTOR
M. E. KROM
BY
S E Hollander
ATTORNEY

United States Patent Office 3,093,708
Patented June 11, 1963

3,093,708
TELEPHONE LINE CONCENTRATOR SYSTEM

Myron E. Krom, Columbus, Ohio, assignor to Bell Telephone Laboratories, Incorporated, New York, N.Y., a corporation of New York Filed Mar. 29, 1961, Ser. No. 99,078
18 Claims. (Cl. 179—18)

This invention relates to remote telephone line concentrators and more particularly to concentrator systems incorporating a plurality of remote switching units governed by a single control unit at the central office which is equipped to allocate priority between the two remote units in the event of simultaneous originating calls thereat.

Recently telephone line concentrators have enjoyed considerable demand for the purpose of terminating substation lines at a locale remote from the central office and extending a lesser plurality of trunks (i.e., "concentrating" the lines into a smaller number of trunks) to the telephone central office. The advantages of concentration are manifest and need not be reiterated here beyond the observation that substantial savings in outside plant and copper costs are effected by virtue of the lack of necessity to extend each line directly to the office.

For several reasons one of the most sought after types of line concentrators is the so-called universal type. Perhaps the most compelling reason for its popularity is its literal universality or ability to function compatibly with most conventional switching systems. At the essence of the universal concentrators capability to cooperate with varying switching systems is a so-called "control unit" which is located at the central office and serves to effect a bridge between the incoming concentrator trunks and the previously existing central office line terminations. In one sense, the control switching unit is in the nature of an applique circuit adapted to extend a connection over an incoming concentrator trunk from a remote concentrated line to the particular existing line termination in the telephone central office to which the line would have been connected it, indeed, it were directly connected to the office. Moreover, the control switching unit must include sufficient versatility and intelligence to perform these control operations autonomously in order to preclude the necessity of any substantial structural modification of the conventional equipment in the telephone central office. In brief, the control switching unit is an instrumentality capable of sophisticated switching performance and by its nature has necessarily evolved into a relatively expensive and intricate unit.

An example of a progressive type of control unit suitable for use in conjunction with the universal line concentrator and possessing the capabilities referred to above is described in detail in my application Serial No. 65,975, filed October 31, 1960. This disclosure includes the classical configuration of a universal line concentrator in which a number of substation lines at a remote locale are grouped or concentrated in a triangularly converging switching network into a relatively smaller number of trunks which extend to the telephone central office. At the office the trunks are coupled to a generally triangular diverging network through which the lines are "fanned out" to a number of conventional substation line terminations previously existing in the central office and individual to the concentrated substation lines. The latter terminations represent the same facility to which the concentrated line would have been connected if directly connected to the central office.

It is apparent from the above that a number of progressive prior art concentrators require an individual control switching unit with its concomitant expense and complexity to terminate the trunks leading from a single remote switching unit.

Although completely operative and desirable, this type of concentrator system harbors a number of significant limitations. Thus, pragmatic considerations dictate that the remote switching unit be physically disposed as close to the center of density of the substation lines to be concentrated as is technically feasible. The controlling factor here is the minimizing of copper requirements between the substation line and the remote switching unit itself. This procedure is logically apparent, and if the substation lines have but a single density center, i.e., they are grouped in substantially a single common geographical area, the procedure is satisfactory since a single remote concentrator unit may be located at the single density center.

Realistically, however, it is not difficult to conceive of a practical situation in which two separate and substantial groups of subscribers are located at a considerable distance from each other and are served by the same central office—yielding two discrete density centers.

As a simple illustration, it may be assumed that a single telephone central office serves, among other subscribers, two development-type communities. One of the communities being disposed east of the central office and the other west of the central office. Obviously, if a single remote concentrator unit is employed, no satisfactory density center is available. Manifestly, the disposition of a single remote unit at either one of the communities would be impractical for terminating the lines of the other community. In fact, it would be defeative of the motivating purpose of line concentration, at least with regard to the distant community, since the substation lines of the distant community connected to the concentrator would actually be longer than the lines which would have connected that same community to the central office.

It would be eminently more practical to provide a single remote switching unit at each of the communities thereby satisfying the rule of locating the concentrator unit at the actual density center. Unfortunately, as explained above, a separate control switching unit has heretofore been generally required for each remote unit. In brief, if two remote switching units are utilized, two control units are required. In view of the financial outlay necessary for the complex control unit, consideration of the disposition of the two separate remote units at the actual density centers may be adversely influenced by, or in fact overruled by, the expense entailed in providing two separate control switching units.

It is, therefore, an object of this invention to provide a telephone concentrator system in which two separate concentrator switching units physically isolated one from the other and disposed at two distinct subscriber density centers are connected to and served by a single control unit at the telephone central office.

An additional object of this invention is to provide a concentrator system in which separate remote concentrator units may be disposed at subscriber density centers and serviced by a single control unit at the telephone central office.

The economic advantages of providing two physically isolated remote units to more efficiently serve separate areas of subscribers are compelling. Nevertheless, as is often the case when substantial innovations are effected in the telephone plant, the advantageous results are tempered by the generation of previously nonexistent switching problems. One such difficulty, which arises as a result of the cleavage between the two remote units served by a single control unit, is the recognition that the remote units are not in direct communication with each other.

Thus it is conceivable that a plurality of simultaneous originating calls may exist in each of the units independently and the problem to be resolved is the allocation of priority between the units. It is significant to observe that as to a single remote unit, per se, the problem of simultaneous originating calls may be overcome by appropriate allocation facilities at the remote unit itself. However, since a particular remote unit can have no information concerning the condition of lines in its distant companion unit, some other facilities must be provided for servicing originating calls made simultaneously at the two remote units.

It is, therefore, an object of this invention to provide in the central office for allocation of simultaneous originating calls as between two distant remote units, inter se.

An additional object of this invention is to provide for the suppression of originating calls at a remote unit not accorded priority.

These and other objects and features of the invention are achieved in an illustrative embodiment in which two separate and physically removed remote units of fifty lines each have access to two groups of ten trunks respectively which connect the concentrator to the central office. At the office a single control switching unit is designed to terminate the trunks from both remote units. In addition to the ten trunks referred to which serve as speech or communication trunks, each remote unit communicates with the control unit via two signal pairs which carry control signal traffic between the remote units and the control unit.

Briefly, the signaling circuit at the remote units and the control unit connected to the control signal pairs include a sensitive relay and a marginal relay at the control unit and the remote unit. A ternary signaling system fully described in my previous application referred to above is provided in which no current on a given signal conductor results in none of the relays being operated. Low current results in the operation of only the sensitive relays and high current operates all of the relays. The system is bidirectional since it can originate signals at the remote unit in the event of an originating call and can moreover originate signals at the control unit in the event of a terminating call.

In the present embodiment additional facilities have been incorporated in the control switching unit at the central office for rendering a single control unit capable of processing two physically divorced remote units. These facilities include, moreover, equipment responsive to the simultaneous generation of a plurality of calling conditions at both of said remote units to allocate priority to one remote unit and to temporarily disenable the other. Illustratively this equipment may include a group of relays individual to the remote switching units and disposed in the control unit at the central office.

In response to signals over the signal conductors leading to a first remote unit, these relays will react in a manner to temporarily divorce the second remote unit from signaling access to the control unit. Also, this equipment is sufficiently versatile in the event of a signal representing a service request condition at the second remote unit to thereafter temporarily preclude access by the first remote unit to the signal facilities of the control switching unit.

Perhaps the most critical threat to the satisfactory operation of two remote switching units with a single control switching unit derives from the rare but finite possibility that both remote switching units will transmit service request indications over the signal conductors to the control switching unit precisely simultaneously. Under these circumstances ordinary preference allocation facilities would be unsatisfactory. In the instant illustrative embodiment this contingency is provided for by permitting separate sensory units in the control switching unit responsive to service request signals from the remote switching units to operate simultaneously. To preclude any possibility of mutual lockout and the difficulties attendant thereon, facilities are provided to positively release one of the operated sensory devices in accordance with a predetermined preference pattern. In short, if two precisely simultaneous requests are made by the two remote switching units for seizure of the control unit to serve two precisely simultaneous originating calls, the control switching unit of its own volition will select a particular remote switching unit which it prefers to serve and will rupture the connection to and discard (temporarily) the other requesting unit despite the fact it has transmitted a bona fide service request condition.

These and other objects and features of the invention may be more readily comprehended from an examination of the following specification, appended claims and attached drawings in which:

Figure 4:
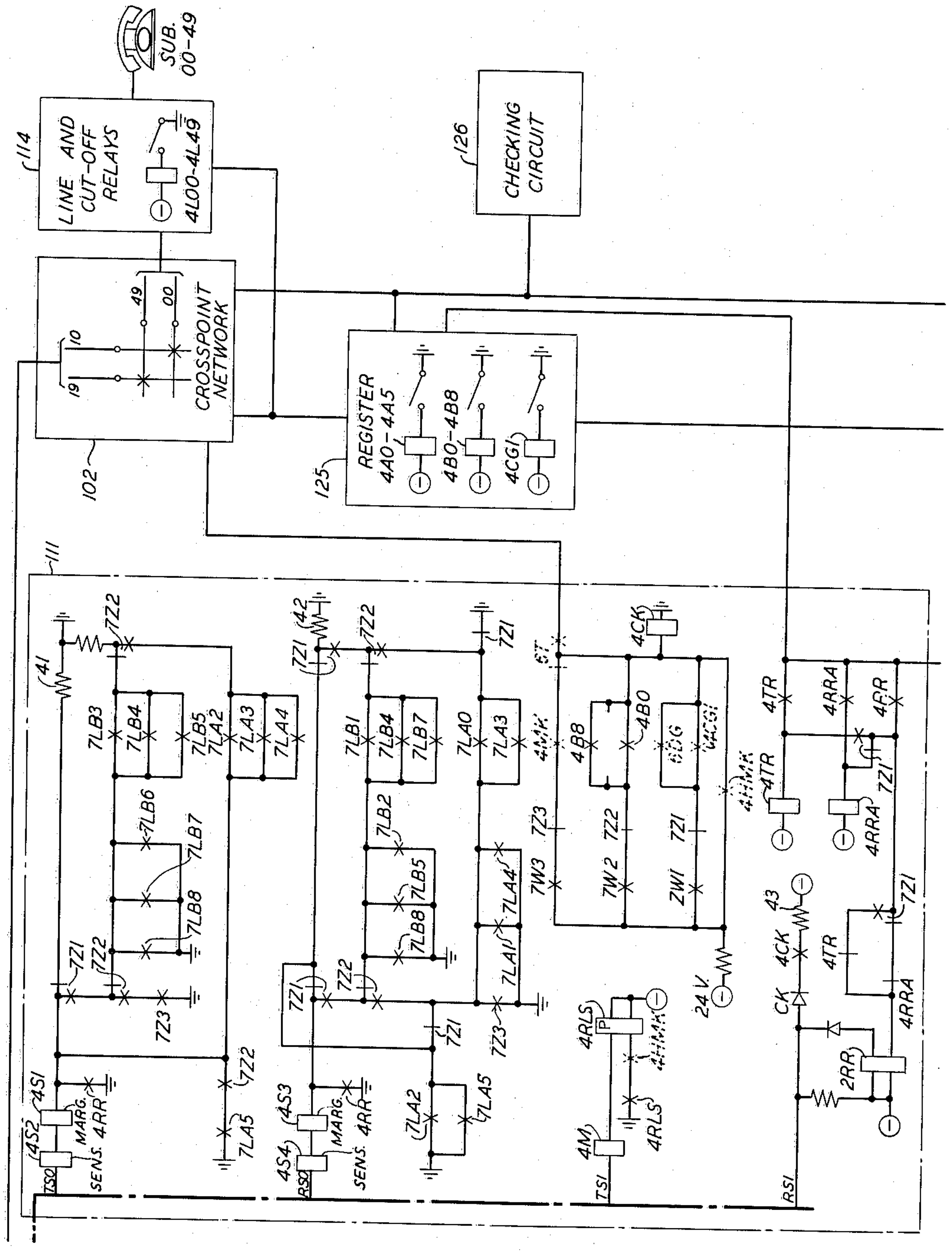
Figure 5:
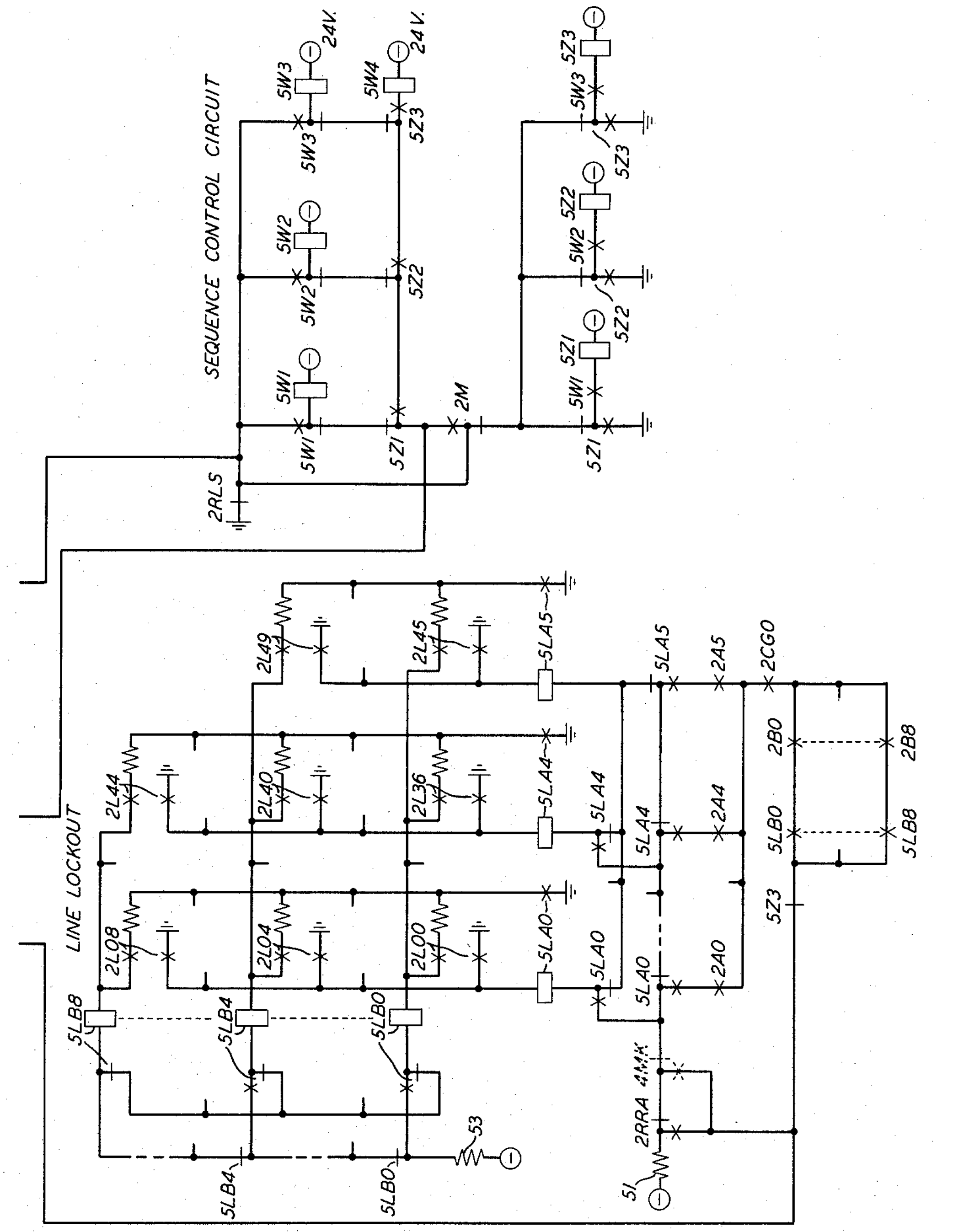
Figure 6:
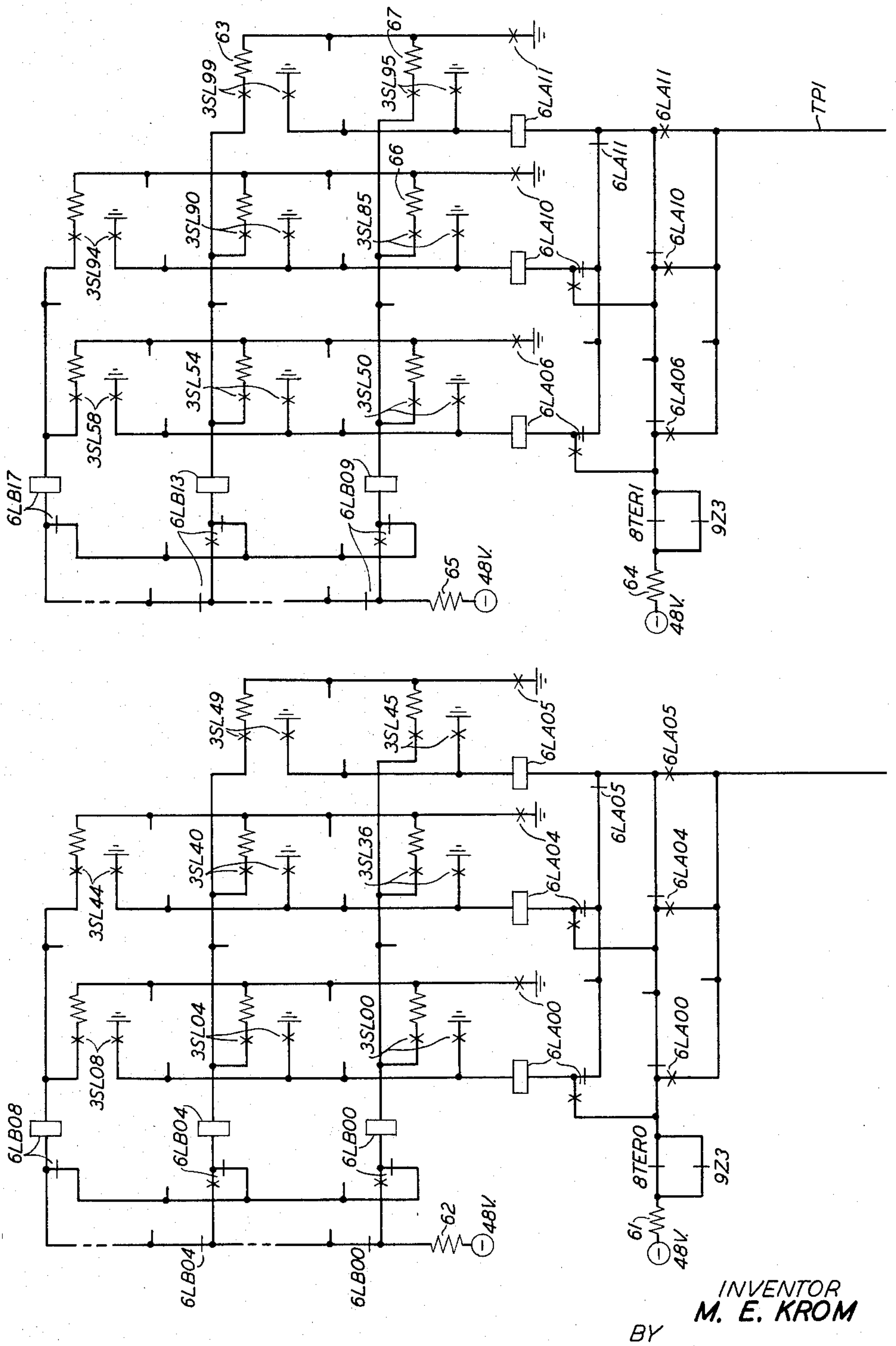
Figure 7:
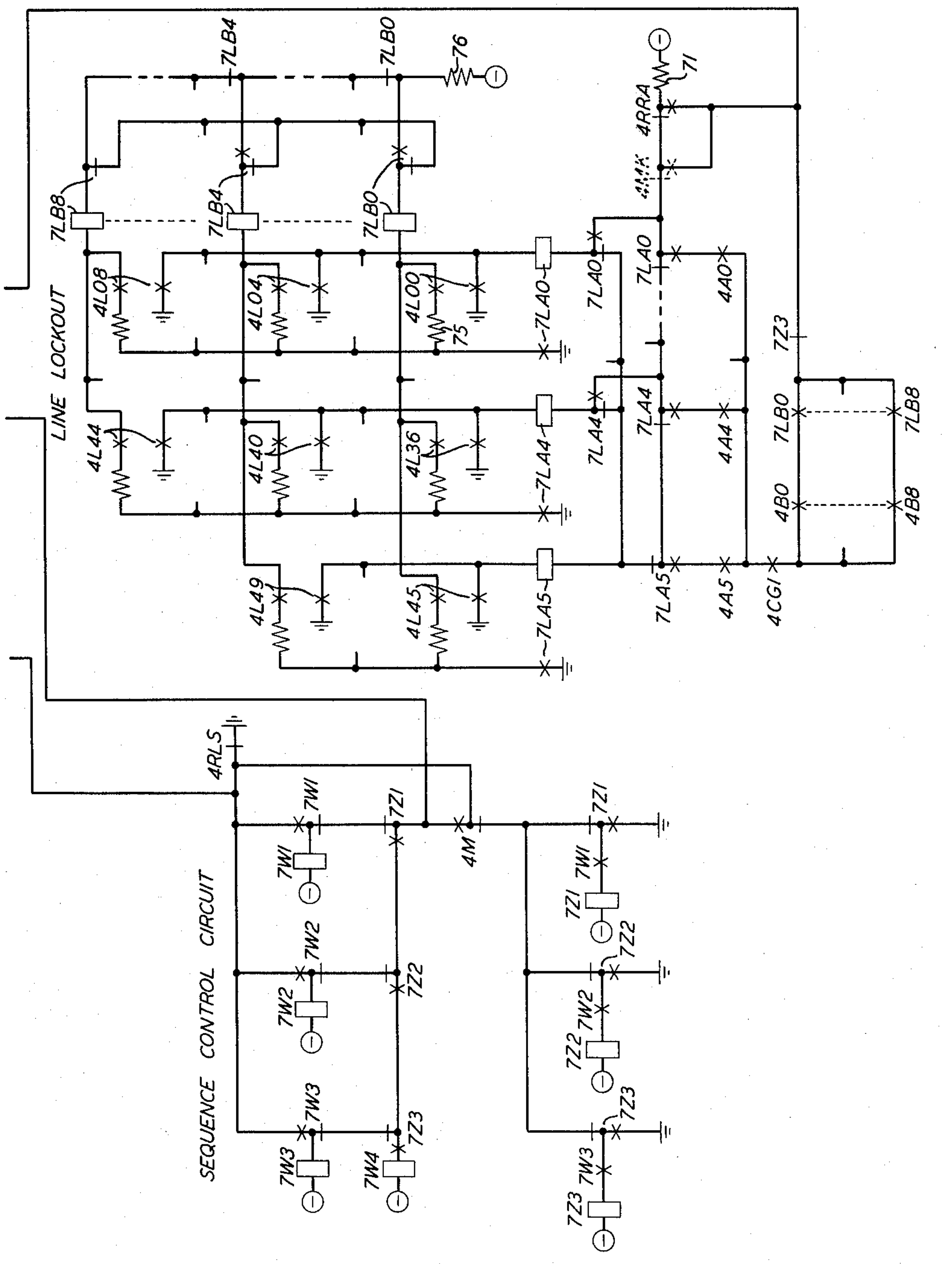
Figure 8:
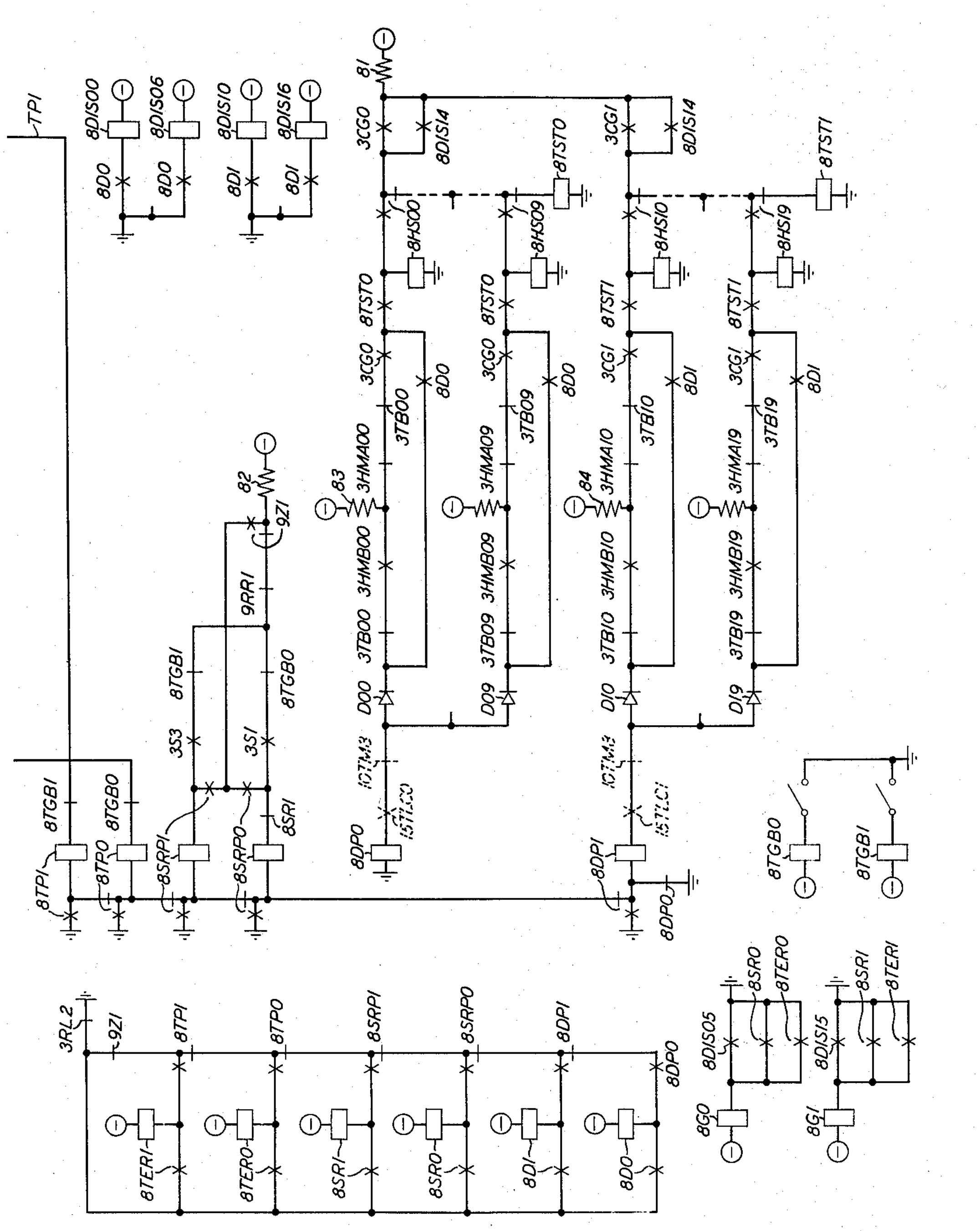
Figures 9, 10:
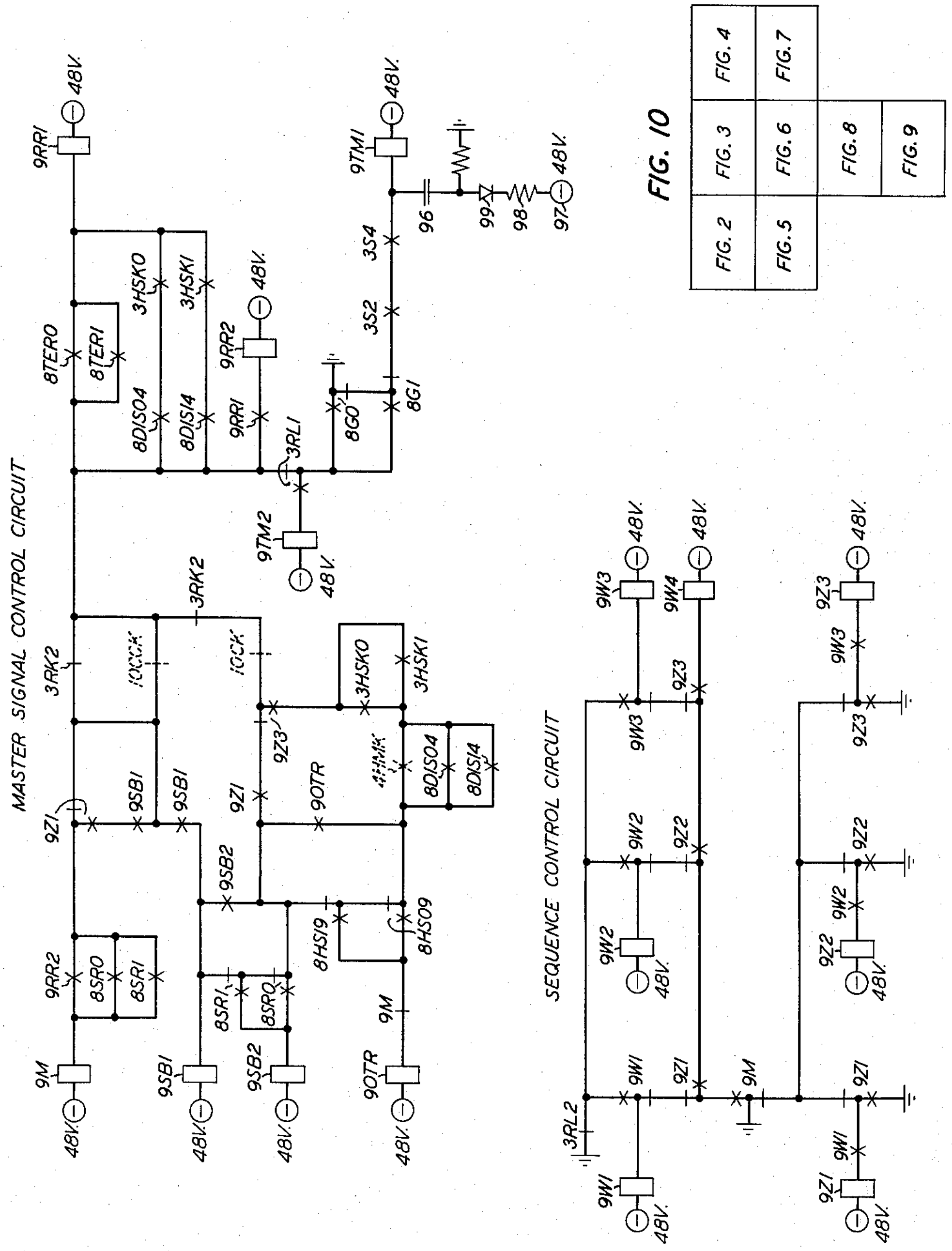

FIG. 4 includes equipment relating to the signaling facilities at the second remote unit;

FIG. 5 shows a line lockout facility and sequence control circuit of the first remote unit;

FIG. 6 includes line lockout and identification circuitry at the control switching unit;

FIG. 7 includes line lockout and sequence control circuitry at the second remote switching unit;

FIG. 8 shows additional equipment responsive to simultaneous originating and terminating calls at the remote units;

FIG. 9 shows signal control circuitry and sequence control circuitry at the control switching unit; and FIG. 10 shows the manner in which FIGS. 2–9 may be advantageously arranged to disclose the present invention.

*General Description*

Figure 1:
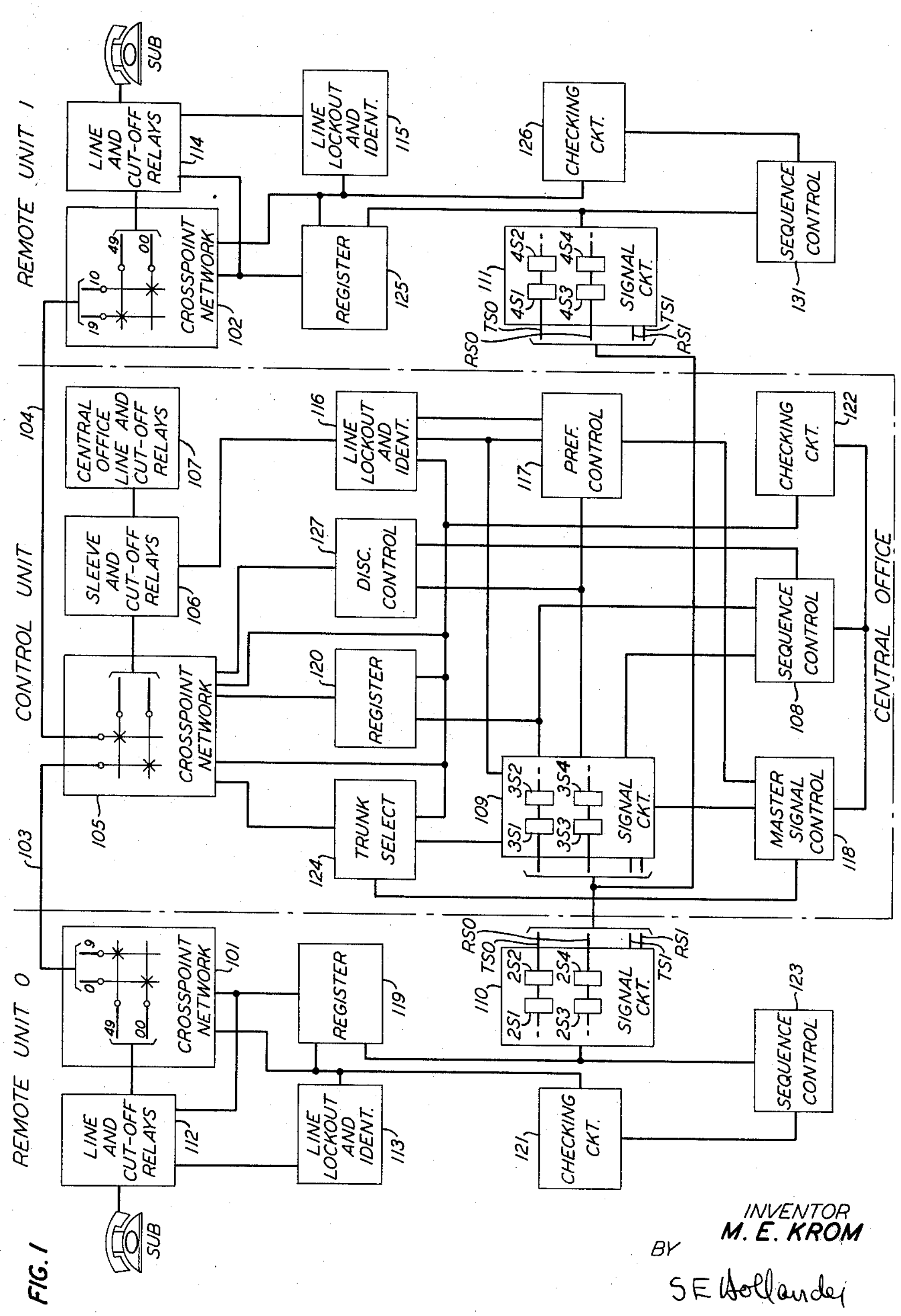
FIG. 1 shows a block diagram of a concentrator system including the two remote units and the control unit at the central office.
Figure 2:
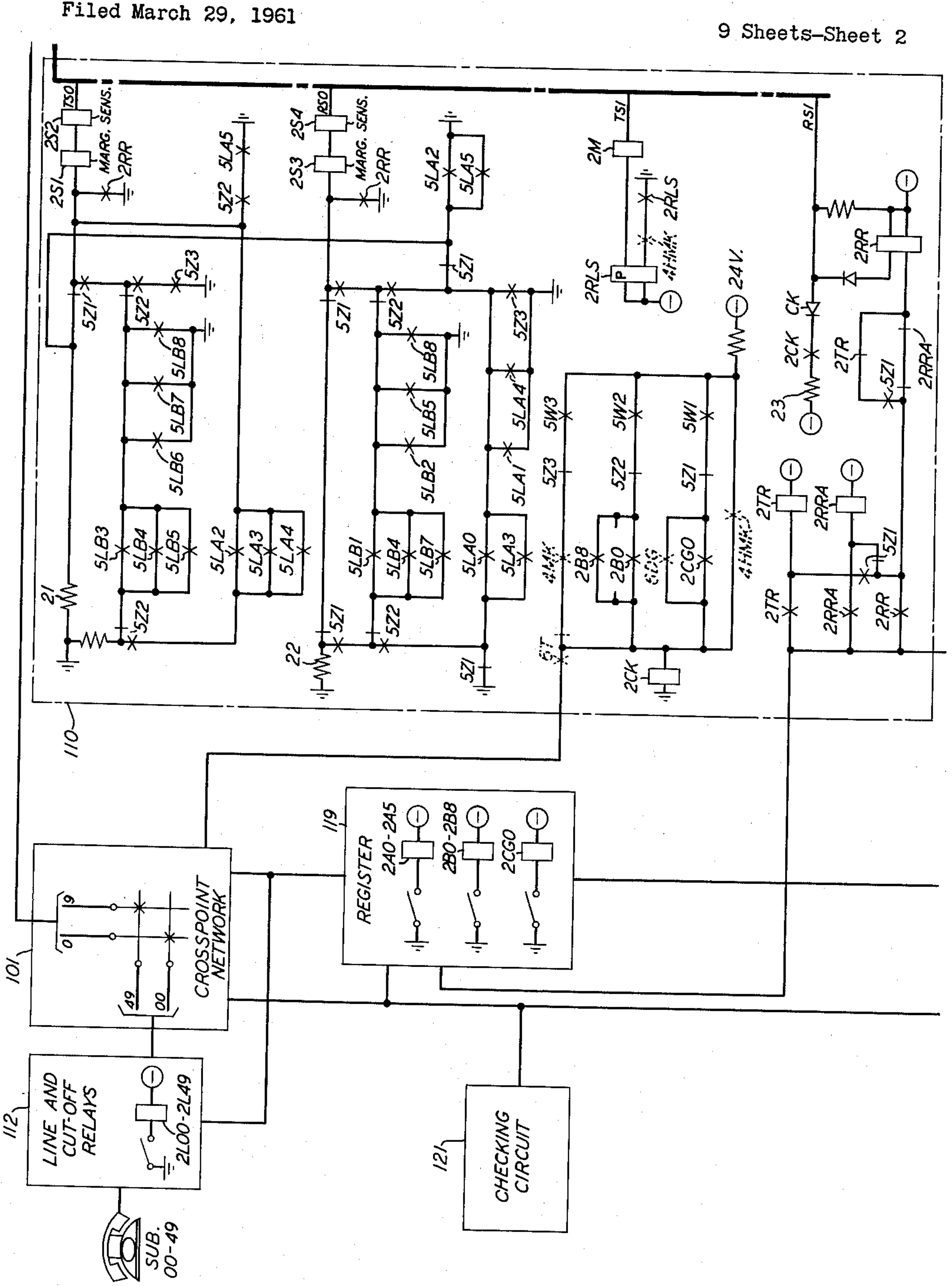
FIG. 2 shows the details of the signal circuitry at one of the remote units together with outline diagrams of other equipment connected thereto.
Figure 3:
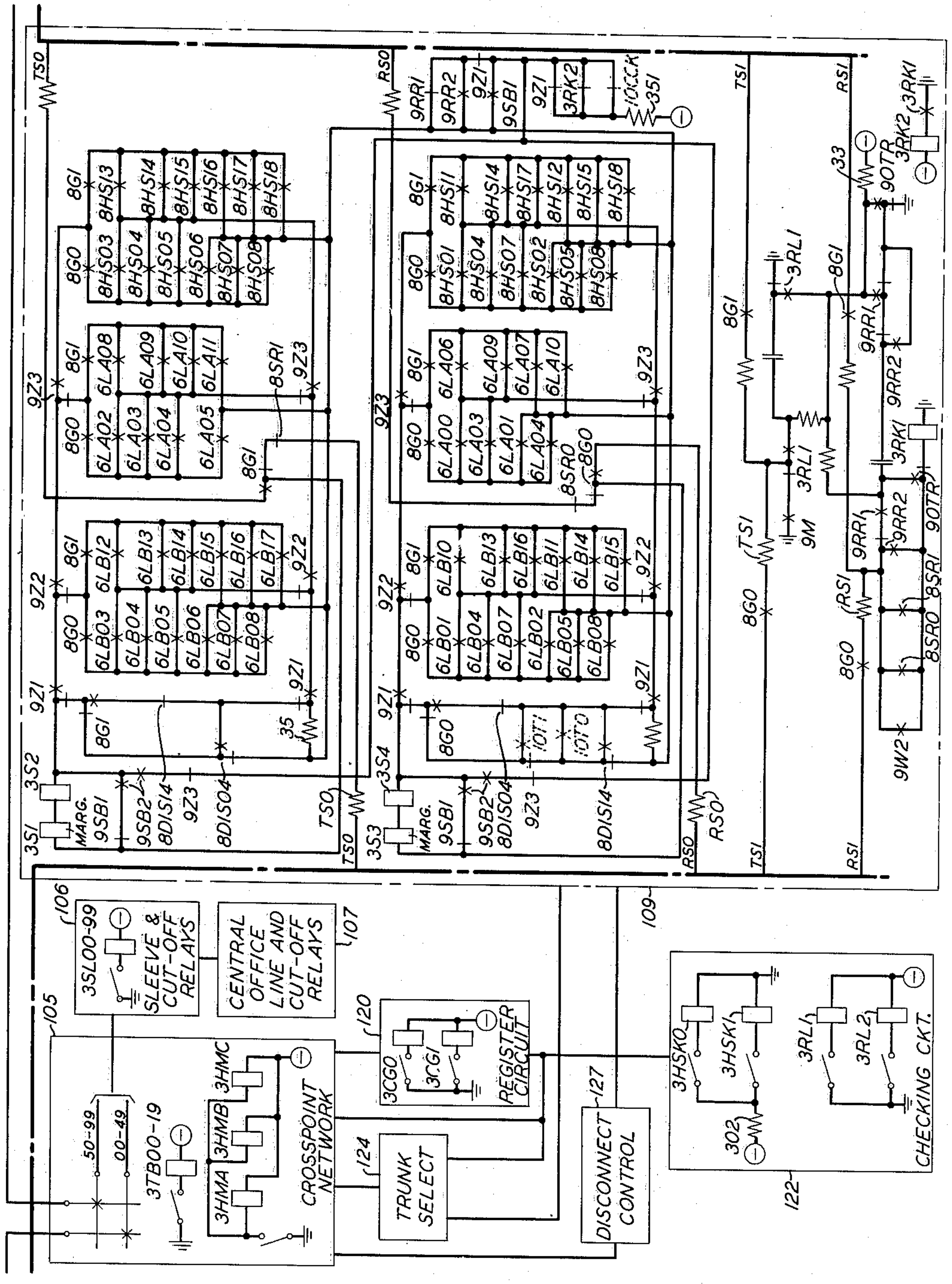
FIG. 3 shows the signaling circuitry at the control swiching unit in the central office together with a portion of the equipment utilized for processing simultaneous originating calls at the remote units.

Referring now to FIG. 1 an outline diagram of the component elements of the concentrator is shown. To comprehend the relationship of the remote unit 0, remote unit 1 and control unit, it is significant to appreciate that each of these elements is illustratively physically removed at a considerable distance from each of the others. For example, remote unit 0 may be illustratively two miles west of the control unit which is located at the central office and remote unit 1 may be located two miles east of the control unit. It is manifest that, under these conditions, the remote units are four miles distant from each other though nevertheless served by the same control unit. (In consequence of space limitations in FIG. 1 the perspective of distance between the units is unavailable.)

It will be observed in the following description of the apparatus in FIG. 1 and in the detailed descriptions of FIGS. 2–9 that only those aspects of the concentrator equipment requisite for an understanding of the present invention are analyzed in detail. For a comprehensive description of the remaining facilities reference may be made to an application of M. E. Krom, field October 31, 1960, Serial No. 65,975, which is herewith incorporated by reference. Relay contacts having windings shown in the above application and omitted here to preserve clarity are rendered in dotted outline. For facility of comparison similar structures have been given the same functional designations although the figure numbers differ from the previous application.

For clarity of presentation the concentrator equipment will be analyzed with regard to the major components thereof in general form followed by a general description of the operation of the circuitry and ultimately a detailed description of the operation of the circuitry.

*Major Components*

It is apparent from FIG. 1 that the control unit is located at the central office and is coupled to the two remote units over a plurality of trunks 103 and 104 which illustratively may each be ten in number. Moreover, the remaining connections between remote unit 0 and the control unit and between remote unit 1 and the control unit comprise two pairs of signal conductors specifically TS0, RS0, TS1 and RS1.

*Signaling Circuitry*

A signaling circuit 109 at the control unit includes two pairs of sensitive and marginal relays 3S1–3S4. The relays are designed and connected in order that the sensitive relays 3S2 and 3S4 be operated when a minimum current is supplied to the signaling circuit but the marginal relays are arranged to present a sufficient threshold or "margin" before operating to insure that a current flow greater than that merely necessary to operate the sensitive relay has been supplied. Similar facilities are available in the remote units 110 and 111 through signal relays 2S1–2S4 and 4S1–4S4. With reference to signal circuits 111 and 109 a sensitive and marginal relay, for example 3S1 and 3S2, is intended to operate in conjunction with a complimentary sensitive and marginal relay 4S1 and 4S2 over conductor TS0 in signal circuit 111 at remote unit 1. Moreover, if sensitive relay 3S2 alone is operated in signal circuit 109, relay 4S2 alone will be operated in remote unit 1. Thus the four relays 3S1, 3S2, 4S1 and 4S2 are coupled by the single conductor TS0 and are adapted for bidirectional operation. In short, the signals may originate at control unit signal circuit 109 to convey information to the remote unit signal circuit 111 in the case of a terminating call where the information concerning the called number would of necessity originate at the central office or control unit.

In the case of an originating call, signal information concerning the calling line identification will originate at the remote unit signaling circuit 111 to operate complimentary relays in signal circuit 109 at the control unit. Both signal circuits are operated simultaneously under control of either unit. If the signaling relays are operated, the information stored therein is delivered to the respective registers 125 and 120. A similar analysis may be made of the signal circuits 110 and 109 of remote unit 0 and the control unit and registers 119 and 120.

*Master Signal Control Circuit*

To govern the operation of the remote unit and control unit signaling circuits inter se on originating and terminating calls, a master signal control circuit 118 shown in detail in FIG. 9 is utilized.

*Line Lockout and Line and Cut-Off Circuits*

The line lockout circuits are shown generally at 113 for remote unit 0, 115 for remote unit 1 and 116 for the control unit. Moreover, they are shown in further detail at FIGS. 5, 7 and 6, respectively. The line and cut-off relays associated therewith are shown at 112 for remote unit 0, 114 for remote unit 1 and 106 for the control unit.

To identify a calling line on a service request call, two specific relays in the line lockout circuits of the remote units are operated under control of the specific line relay in circuits 112 and 114 associated with the particular subscriber originating the service request call. Thus a particular relay 7LA– in the line lockout circuit of FIG. 7 and a particular relay 7LB– will be operated.

At the control unit identification circuit 116, a terminating call is recognized by a change in the sleeve condition in the central office which operates a sleeve relay in equipment 106 associated with the particular calling line. The sleeve relay is individual to the line and initiates identification of the calling line through two groups of relays 6LA– and 6LB– similar in over-all configuration to those shown for line lockout circuits 115 and 113 at the remote units. It will be noted that the line terminations at the circuit 106 are further extended to the line cut-off relays in circuit 107 at the central office. The latter relays represent the conventional existing line circuit termination in the central office.

*Checking Circuits*

Checking arrangements are provided as shown in general outline at 121, 122 and 126 at the remote units and the control units to verify the accurate operation of the signaling circuitry and other equipment in the concentrator. Additional measures are taken by the checking circuitry to ascertain that valid identifications have been established for calling and called lines and to assure that the appropriate hold magnets and trunk relays are operated.

*Trunk Selection*

A trunk selecting circuit 124 determines which idle trunk is to be selected to service a particular call. The circuit includes a plurality of relays individual to the trunks and is utilized for selection of a trunk for connection and disconnection as explained in detail in the above-referred-to application.

*Disconnect Control*

A disconnect control circuit 127 is utilized to insure that a minimum of four lines from remote unit 0 and four lines from remote unit 1 will be "cut through" to the central office. The disconnect control circuit is disabled when four or fewer lines per group are cut through to trunk circuits. In consequence of this feature, the lines connected to the remote units will remain cut through even though they are not in actual conversation if less than four lines at a particular remote unit are cut through.

*Crosspoint Networks*

An important element of each of the remote units and the control unit is the switching facilities through which the lines are remotely concentrated from an illustrative fifty lines to an illustrative ten speech trunks and deconcentrated or "fanned out" in the crosspoint network at the central office to a number of terminations equal in number to the number of concentrated lines. In FIG. 1 the remote crosspoint networks are shown at 101 and 102 and the central office or control unit crosspoint network is shown at 105. Lines appear on the switch horizontals and trunks on the verticals in each instance. Each of the lines in a group of fifty lines has full access to the ten trunks connected to the respective crosspoint network at the remote units.

The hold magnets utilized in the units are of the magnetic latching type to reduce power drain. Reference may be made to an article entitled, "Magnetic Latching Crossbar Switches," Bell System Technical Journal, September 1960, page 135, for a description of suitable apparatus.

*Sequence Control Circuit*

Groups of "W—Z" relays are appropriately arranged at the remote units and at the control units as shown at 123 and 131 and in detail at relays 5W1–5W3 and 5Z1–5Z3. Similar facilities are available through relays 9W– and 9Z– and 7W– and 7Z– at the control unit and remote unit 1, respectively. These relays are adapted to be sequentially operated in the order –W1, –Z1, –W2, –Z2, etc. The operation of the relays modifies contact paths in the signaling and other circuits to permit the progression of the control unit and other circuitry through the steps necessary to complete calls. In essence, the over-all function of the sequence control circuitry at the remote units and the control units is similar to that of a stored program in computer technology for dictating the order of particular operational sequences.

*Register Circuitry*

Registration equipment at the control unit and at the remote unit is shown in outline form at 119, 120 and 125. This circuitry includes groups of relays, e.g., relays 2A0–2A5 and 2B0–2B8 adapted to register information pertinent to a concentrator connection operation. Similar registration facilities are available in the relays at register 125 and at 120 although not specifically shown in the latter. It will be noted that register 120 includes relay facilities 2CG0 and 3CG1 for discriminating between the respective identities of remote unit 0 and remote unit 1.

*General Description of Operation*

As indicated briefly heretofore, two combinations of sensitive and marginal relays and the application of three current levels to the signal conductors TS0, RS0, TS1 and RS1 yield a total of nine signals for transmitting digital information.

In the case of an originating call, the signal relays are operated in accordance with the information stored in the line lockout circuit 115 (assuming that the call originates at remote unit 1). The latter circuit in turn is responsive, as indicated above, to the operation of a particular line relay in circuit 114. In view of the bidirectional character of operation of the signal relays, signal circuits 111 and 109 are energized simultaneously to reflect the appropriate information, which information is stored thereafter in the corresponding register circuits 125 and 120.

For a terminating call, information concerning the called line originates in the line lockout circuit 116 which is itself responsive to the operation of a particular sleeve relay in circuit 106. At this time signal circuits 109 and 111 (assuming that the call is intended for remote unit 1) are energized simultaneously but under control of signal circuit 109 and the information is thereafter stored in registers 125 and 120.

The information is transmitted sequentially by four separate signaling sequences under control of the sequence control circuitry. The first signal relates to the particular remote unit involved in the call and whether the call represents a connect or disconnect indication. The second digit represents what is hereinafter referred to as the "B" part of the line number. The third signal represents the remaining information necessary to identify the particular line (the "A" part of the line number) and the fourth signal comprehends the trunk identification.

This information is fully adequate to identify the particular remote concentrator involved, a specific line within that concentrator and the trunk selected to serve the call.

In general, conductors TS0 and RS0 are utilized to furnish the information described above. However, since the ternary signaling aspect provides a maximum combination of nine digit indications and since ten trunks are available to each of the remote concentrators, special facilities must be provided for identifying a tenth trunk. This information is transmitted over signal pairs TS1 and RS1, which latter pair is also utilized for various control functions including advancing the sequence control at the remote units and the control unit for checking indications and for concentrator release indications.

*Service Request Calls*

Referring to FIG. 1, when a call is originated, at remote unit 1 for example, a line relay in circuit 114 individual to the calling substation is operated and in turn results in the operation of two identifying relays in line lockout circuit 115. The latter relays supply information to the signal circuitry reflecting the particular concentrator in which the calling line is located and also the class of call to be served (service request, terminating or disconnect). Thus the signal relays in circuits 109 and 111 are simultaneously operated in accordance with a particular code arrangement and since the calling line is illustratively assumed to be in remote unit 1, the information represents concentrator 1.

After the operation of the signaling relays, the register relays in circuits 120 and 125 are operated in accordance with the information stored in the signal relays. At this time, the concentrator identification is stored in the register circuit 120 of the control unit.

When the registration has been completed and checked, the checking circuits 122 and 126 release the signal relays, and by means of W—Z relay combinations the sequence control circuits 108 and 131 are simultaneously advanced.

The signal circuits 111 and 109 are again energized, this time in response to the particular relay 7LB– in the line lockout circuit which indicates the "B" portion of the line number. As above, the signal relays are operated simultaneously to store and transmit the "B" portion of the line number under control of the line lockout circuit 115 and the information is registered in registers 120 and 125 simultaneously and checked by checking circuits 122 and 126.

After the information has been checked in circuits 122 and 126, the sequence control circuits 108 and 131 are again simultaneously advanced to prepare for transmission of the remaining portion of the line identification or "A" information derived from the operated relay 7LA–.

The signal relays 4S1–4S4 and 3S1–3S4 are again operated in a code which now reflects the "A" information and the register circuits 120 and 125 are simultaneously loaded with the indications stored in the signal relays of circuits 109 and 111. The sequence control circuits are once more advanced by the operation of the final group of W—Z relays. Until this time the information transmission has been in a direction from the remote unit to the control unit to transmit the identity of the calling line and the particular remote concentrator involved. Since the last item of information relates to the trunk and must originate at the control unit, the direction of the signal information transmission is now reversed and signal circuit 111 is placed under control of signal circuit 109, which in turn is operated in response to the selection relays of circuit 124 to register the trunk number in the remote unit.

Registration of the "A" information as described above signifies completion of the line information and prepares paths for operating appropriate select magnets in the crosspoint networks 102 and 105.

When the group and line registration and the select magnet operation has been checked in the checking circuit 122 a circuit is completed for operating a cut-off relay in circuit 106. This operation is individually checked and if the attempt to operate the cut-off relay is successful the hold magnets are operated at the control unit in network 105 and checked. Subsequently, the trunk number is transmitted to the remote unit by appropriate operation of the signal relays 3S1–3S4 and the trunk information is simultaneously registered in registers 125 and 120

When the trunk information has been recorded and the appropriate checking operation has been completed in the checking circuits, a circuit is completed for operating the trunk hold magnets in the remote unit network 102. This completes the process of setting up the call and causes the control unit and remote unit to prepare for release.

When the release of both units is accomplished, the line is connected to the trunk at both units through magnetically latched hold magnets. The only other relays which remain operated are the cut-off relays (also magnetically latched) and a "clean" tip and ring metallic connection is available through the concentrator.

*Simultaneous Originating Calls at Remote Units 0 and 1*

Heretofore the course of operation of the concentrator during the advent of a service request call at remote unit 1 has been analyzed in general form. It is implicitly understood that the operation of remote unit 0 with respect to the control unit on a service request call is substantially similar in nature. It is necessary, however, in view of the dissociation of remote unit 0 from remote unit 1, to examine the patterns of operation when the control unit must cope with the following contingencies.

(A) Seizure of the signal circuit 109 at the control unit in response to service request information being transmitted by signal circuit 110 of remote unit 0, immediately followed by an attempt by the signal circuitry 111 at remote unit 1 to seize signal circuit 109 at the control unit, also in response to a service request;

(B) Seizure of the signal circuitry 109 at the control unit in response to signal information transmitted by signal circuit 111 at remote unit 1 in consequence of an originating call thereat, immediately followed by an attempt by signal circuit 110 to seize control signal circuit 109 also in response to an originating call thereat; and (C) The precisely simultaneous seizure of signal circuit 109 in the control unit by signal circuits 110 and 111 in response to simultaneous service request calls at the two disparate units.

Prior to proceeding to analyze the response of the concentrator circuitry to these eventualities it is significant to observe that, in the previous application referred to above, this type of difficulty was nonexistent in view of the single remote unit coupled to the control unit at the central office. Since in the present arrangement two separate remote units, which are physically isolated from each other, are coupled to a single control unit and since the remote units are not in direct signal or communication contact, inter se, the response to the problem of allocating service between the two by a single control unit which operates on a space division basis is of pressing importance.

As will be shown in detail herein, the signal circuits 109, 110 and 111 are coupled to each other in a flexible and versatile manner. Facilities are provided for divorcing signal circuit 110 from signal circuit 109, for divorcing signal circuit 111 from signal circuit 109, for precluding access to signal circuit 109 by signal circuit 110, for precluding access by signal circuit 111 to signal circuit 109, and for rupturing an existing connection between signal circuit 110 and signal circuit 109.

*Detailed Description*

In the following detailed description of the operation of the circuitry again only those aspects of the invention essential for comprehending the present invention will be discussed. For a comprehensive treatment of ancillary equipment shown in general form here and for the relay winding connections of the contacts shown in dotted line reference may be made to the above-referred-to application of M. E. Krom.

In the idle condition of the control unit relays 3S2 and 3S4 are operated. Corresponding relays 2S2 and 4S4 at the remote units are also operated. For example in the case of relay 3S2 a path may be traced from negative battery, resistance 351, contacts of relays 10CCK, 3RK2, 9Z1, 9RR1, 8DIS04, 8G1, 9Z1, windings of relays 3S2, 3S1, contacts of relays 8G1, 8SR1, conductor TS0, winding of relay 2S2, winding of relay 2S1, contacts of relay 5Z1, resistance 21 to ground. Although current traverses relays 2S1 and 3S1 these relays do not operate in view of the marginal threshold included in their design which precludes operation when resistance 21 is in the operating path. A similar circuit may be traced for relays 2S4 and 3S4 to concentrator 1.

*Service Request at Remote Unit 1*

When a service request is made, for example at remote unit 1 in FIG. 4, the resistance ground on conductor RS0 is changed to a direct ground connection.

More specifically, when the subscriber assigned to substation 00 lifts his receiver, an appropriate line relay 4L00 is operated over the loop. Thereafter line identification relays 7LA0 and 7LB0 are operated to identify the calling substation line. The operating path for relay 7LA0 may be traced from ground, contacts of relay 4L00, winding of relay 7LA0, contacts of relays 7LA0, 7LA5, 7LA4, 7LA0, 4MK, 4RRA, resistance 71 to negative battery. It will be noted that the equipment shown in dotted outline is not shown in detail herein as not essential to an understanding of the present invention but is explained comprehensively in the above-referred-to application.

Relay 7LB0 thereafter operates over a path from ground, contacts of relay 7LA0, resistance 75, contacts of relay 4L00, winding of relay 7LB0, contacts of relays 7LB0, 7LB8, 7LB4, 7LB0, resistance 76 to negative battery. Relays 7LA0 and 7LB0 lock operated over their contacts.

Operation of relay 7LA0 in the line lockout circuit causes operation of a signal relay appropriate to identify the originating call as emanating from concentrator 1. In the particular illustrative embodiment shown, operation of relay 7LA0 causes the operation of signal relay 4S3 over a path from ground, contacts of relays 7Z1, 7LA0, 7Z1, 7Z1, windings of relays 4S3, 4S4 over conductor RS0, contacts of relays 8SR0, 8G0, windings of relays 3S3, 3S4, 9Z1, 8G0, 10T1, 8DIS14, 9RRI, 9Z1, 9Z1, resistance 351 to negative battery.

It will be seen that if substation 00 at concentrator 0 had gone off-hook, relays 2S1 and 3S1 would be operated instead of relays 3S3 and 4S3.

With relays 9RR1 and 8TGB1 unoperated, relay 8SRP1 will operate over a path from negative battery, resistance 82, contacts of relays 9Z1, 9RR1, 8TGB1, 3S3, winding of relay 8SRP1, contacts of relay 8SRP0, 8DP1, 8DP0 to ground. The operation of relay 8SRP1 in this manner identifies the calling line as originating in concentrator 1.

Operation of relay 8SRP1 closes a locking path for itself over its own contacts and closes a path for the operation of relay 8SR1 which may be traced from ground, contacts of relay 3RL2, 9Z1, 8TP1, 8TP0, 8SRP1, winding of relay 8SR1 to negative battery.

Operation of relay 8SR1 opens signal conductor TS0 to concentrator 0 at the contacts thereof. In addition, relay 8G1 is operated over the contacts of relay 8SR1 to close conductor TS0 to concentrator 1 and conductors TS1 and RS1 to concentrator 1.

Operation of relay 8G1 closes an operating path for the operation of relay 9M which may be traced from ground, contacts of relays 8G0, 9G1, 3RL1, 3RK2, 9Z1, 8SR1, winding of relay 9M to negative battery. Operation of relay 9M at the control unit results in the operation of relay 4M at the remote unit over a path including ground, contacts of relays 9M, 3RL1, contacts of relay 8G1, conductor TS1, winding of relay 4M, winding of relay 4RLS to negative battery. Operation of relay 4M results in the operation of relay 7W1 over a path from ground, contacts of relay 4RLS, 4M, 7Z1, 7W1, winding of relay 7W1 to negative battery. Relay 4CG1 in the register circuit now operates over a path shown symbolically by the operation of a manual switch in register 125. Battery potential is applied to signal conductor RS1 over a path from negative battery, resistance 43, contacts of relay 4CK, diode CK to conductor RS1 to indicate that the registration of the concentrator identification has been completed in the remote unit.

Operation of relay 9M at the control unit causes the operation of relay 9W1 over a path which may be traced from ground, contacts of relays 9M, 9Z1, 9W1, winding of relay 9W1 to negative battery.

Operation of relay 9W1 causes the concentrator identification registration to be entered in a register circuit 120 at the control unit shown symbolically by the manual operation of relay 3CG1. The specific manner of operation of relay 3CG1 is shown in detail in the above-referred-to application. Operation of relay 3CG1 causes the operation of relay 8TST1 over a path from ground, winding of relay 8TST1, contacts of relays 8HS19, 8HS10, 3CG1, resistance 81 to negative battery. Operation of relay 3CG1 also partially closes an operating path for relay 8HS10.

Assuming that relay 8HS10 is associated with an idle trunk the operation of that relay may be traced from ground, winding of relay 8HS10, contacts of relay 8TST1, 3CG1, 3TB10, 3HMA10, resistance 84 to negative battery. This action completes a selection of a trunk associated with relay 8HS10. Relays 3RK1 and 3RK2 are now operated in the manner shown in the previous application to indicate that concentrator identification information is registered and completed and the sequence circuit may be advanced to permit handling of the "B" information.

Subsequently the remote unit will transmit the "B" information (7LB– relay operated) and the "A" information (7LA– relay operated) and in addition the control unit itself will transmit trunk information to the remote unit concerning the idle trunk selected to service the call. These operations are treated comprehensively in the above-referred-to application and need not be considered in detail herein.

Ultimately, in response to the transmission of the line identification information from the remote unit to the control unit and the transmission of the trunk information from the control unit to the remote unit, a group of select magnets and hold magnets are operated, the latter being shown symbolically by relays 3HMA–3HMC 00 through 19. Appropriate select and hold magnets, not shown, are operated in cross-point network 102. Thereafter, the control unit and remote unit are both released so far as common equipment is concerned although the hold magnets in the respective crosspoint networks remain latched operated to continue the connection "cut through" the concentrator.

*Terminating Call*

When a terminating call is originated at the central office, ground is placed on the sleeve conductor associated with the line termination in circuit 107 and causes operation of a particular sleeve relay 3SL0-99 associated with the called line. For example, operation of sleeve relay 3SL99 would result in th eoperation of identification relays 6LA11 and 6LB13 in the manner explained in detail in the above-referred-to application. The path for the operation of relay 6LA11 may be traced from ground, contacts of relay 3SL99, winding of relay 6LA11, contacts of relays 6LA10, 6LA06, 8TER1, resistance 64 to negative battery. Relay 6LB13 operates over the contacts of relay 6LA11, resistance 63, contacts of relay 3SL99, winding of relay 6LB13, normal contacts of relays 6LB13, 6LB17, 6LB13, 6LB09, resistance 65 to negative battery.

Operation of relay 6LA11 closes an operating path for relay 8TP1 from battery, resistance 64, contacts of relays 8TER1, 6LA06, 6LA10, 6LA11, conductor TP1, contacts of relay 8TGB1, winding of relay 8TP1, contacts of relays 8TP0, 8SRP1, 8SRP0, 8DP1, 8DP0 to ground.

Relay 8TP1 closes a path for the operation of relay 8TER1 which may be traced from ground, contacts of relays 3RL2, 9Z1, 8TP1, winding of relay 8TER1 to negative battery. Relay 8G1 now operates over contacts of relay 8TER1.

After these sequences haveen performed the transmission of line information, trunk selection, etc. are similar to those described above with respect to a service request call.

*Disconnect Calls*

Trunks are released in the preference control circuit 117 in order of preference when unoccupied provided that five or more in a plurality of trunks extending to a particular concentrator are cut through. Only as many trunks will be released as is required to leave four of the ten trunks to a concentrator in the cut-through condition. This type of operation includes facilities which "delays" disconnecting the subscriber's line from the trunk used in the connection if fewer than four trunks are cut through.

A disconnect request for an individual trunk is initiated if the trunk hold magnet is operated (indicating that the line is still cut through) when the trunk busy relay is normal (indicating that the line is idle) and that the trunk load control relay—not shown herein but shown in detail in the above-referred-to application—is operated (indicating that more than four hold magnets are operated). Under these circumstances, appropriate relays are operated in the disconnect control circuit 127 which will ultimately open the circuits of all sleeve relays toward the central office and connect them to the associated control circuit sleeve leads in circuit 106 to prepare for identifying the line to which the trunk is connected. Moreover, trunk selection circuit 124 selects one of the trunks to be disconnected.

Trunk selection circuit 124 grounds the trunk sleeve of the circuit to be disconnected thereby operating the sleeve relay of the line to which the trunk is connected. When the sleeve relay is operated, the line is identified by operation of the associated lockout circuits in FIG. 6 in the manner described above for terminating calls.

Thereafter appropriate line and trunk information are transmitted to the remote unit in a manner similar to that of a terminating call. Moreover, a disconnect signal is transmitted which causes the release of the operated hold magnets in the remote unit.

*Operation in the Event of Simultaneous Calls*

It will be assumed for purposes of illustration that substation 00 in concentrator 1 of FIG. 4 initiates a service request call and immediately thereafter substation 00 of concentrator 0 also originates a service request call. The pattern of operations in concentrator 1 is described above and includes the operation of a particular line relay 4L00 in response to the operation of the line off-hook condition. This in turn causes particular identifying relays 7LA0 and 7LB0 to be operated to uniquely identify the calling substation line. Since the calling line is in concentrator 1, signal relay 4S3 is operated in the remote unit and signal relay 3S3 is operated in the control unit over a path from ground, contacts of relays 7Z1, 7LA0, 7Z1, 7Z1, winding of relay 4S3, winding of relay 4S4, conductor RS0, contacts of relays 8SR0, 8G0, winding of relay 3S3, winding of relay 3S4, contacts of relay 9Z1, contacts of relays 8G0, 10T1, 8DIS14, 9RR1, 9Z1, 3RK2, resistance 351 to negative battery. Also as indicated above, operation of relay 3S3 causes the operation of relay 8SRP1 over a path including negative battery, resistance 82, contacts of relays 9Z1, 9RR1, 8TGB1, 3S3, winding of relay 8SRP1, contacts of relays 8SRP0, 8DP1, 8DP0 to ground. Operation of relay 8SRP1 results in the operation of relay 8SR1 over the path described above which in turn causes the operation of relay 8G1 over the contacts of relay 8SR1.

It will be noted that as soon as the contacts of relay 8SR1 are operated the normally closed contacts of relay 8SR1 in series with conductor TS0 interrupt the continuity of that conductor to concentrator 0 thereby precluding the transmission of a seizure signal by concentrator 0 in response to the off-hook at substation 00 in concentrator 0 and a consequent attempt to operate relay 3S1. Thus the seizure of the control circuitry having been made by concentrator 1, concentrator 0 is precluded as soon as relay 8SR1 is operated.

When relay 8G1 operates, conductor TS0 to concentrator 1 is closed as in conductors TS1 and RS1 over the contacts of relay 8G1.

Since remote concentrator 0 cannot seize the control circuit in view of its inability to operate relay 3S1, calling line 00 at remote concentrator 0 must await the release of the common equipment in the control unit which occurs in the manner described above after substation 00 at remote concentrator 1 has been served. At that time when relays 8G1 and 8SR1 are released, concentrator 0 will be granted access to the control circuitry over the closed contacts of relays 8SR1 and 8G1.

If it is assumed that substation 00 at remote concentrator 0 went off-hook concurrently with but earlier than the off-hook condition at remote concentrator 1, the sequence of operation is substantially similar to that described above with the provision that line relay 2L00 will operate priorly and in turn cause the operation of relays 5LA0 and 5LB0 in the line lockout circuit. Here again the operation of relay 5LA0 initiates a seizure signal to the control unit over a path which may be traced from ground, contacts of relays 5Z1, 5LA0, 5Z1, 5Z1, winding of relay 2S1, winding of relay 2S2, conductor TS0, contacts of relays 8SR1, 8G1, winding of relay 3S1, winding of relay 3S2, contacts of relays 9Z1, 8G1, 8DIS04, 9RR1, 9Z1, 9Z1, resistance 351 to negative battery. At this time marginal relays 2S1 and 3S1 (as well as sensitive relays 2S2 and 3S2) are operated.

Operation of relay 3S1 causes the operation of relay 8SRP0 over a circuit from negative battery, resistance 82, contacts of relays 9Z1, 9RR1, 8TGB0, 3S1, 8SR1, winding of relay 8SRP0, contacts of relays 8DP1, 8DP0 to ground.

Operation of relay 8SRP0 results in the operation of relay 8SR0 over a path from ground, contacts of relays 3RL2, 9Z1, 8TP1, 8TP0, 8SRP1, 8SRP0, winding of relay 8SR0 to negative battery. At this time the contacts of relay 8SR0 in series with conductor RS0 immediately preclude access to the control unit by remote line 00 in concentrator 1 through the inability of that concentrator to transmit a seizure signal to relay 3S3. Moreover, relay 8G0 operates over the contacts of relay 8SR0 in consequence whereof conductors TS1, RS1 and RS0 are closed through from the concentrator 0 to the control unit. In short, concentrator 0 having seized the control unit earlier, concentrator 1 is thereafter precluded access until the contacts of relays 8SR0 and 8G0 are released.

In view of the dissociation of concentrator 0 from concentrator 1 and the random nature of service request calls at both units, it is conceivable that both remote units may originate service request calls precisely simultaneously. It is essential under these circumstances, in view of the design of the control unit for space division operation to nevertheless allow only one of the remote units to be serviced.

Since by definition in this illustration, both remote units have already seized the control unit simultaneously, it follows that to satisfy the sequential nature of the operation of the control unit, one of the remote units must be in effect torn from its connection to the control unit to thereafter await future permission for access to the control unit. To illustrate, it will be assumed that substation 00 at the concentrator 0 and substation 00 at the concentrator 1 both go off-hook simultaneously. As discussed above, signal relay 3S1 will be operated in consequence of the service request condition at concentrator 0 over the contacts of relay 8G1 and conductor TSO. Moreover, relay 3S3 will be energized at the same instant over conductor RS0 and the contacts of relay 8G0.

To continue with the duplicate operations, relays 8SRP1 and 8SRP0 are both operated over the contacts of relays 3S3 and 3S1, respectively. Again it will be assumed that relays 8SRP1 and 8SRP0 are operated in perfect synchronism in order that both relays lock operated over their own contacts to ground.

The operation now shifts to the chain of relays including relays 8SR1 and 8SR0. In view of the operation of the contacts of relays 8SRP1 and 8SRP0, an attempt will be made to operate relays 8SR1 and 8SR0. It is apparent, however, from the serial connection of the contacts of relays 8SRP1 and 8SRP0 that, if both operated precisely simultaneously, relay 8SR1 will be favored over the contacts of relay 8SRP1 and, moreover, contacts of relay 8SRP1 will preclude the operation of relay 8SR0. Also, the contacts of relay 8SR1 in series with relay 8SRP0 cause the release of relay 8SRP0 and therefore the release of relay 8SR0. Therefore, if, in some manner, relay 8SR0 had succeeded in operating it would nevertheless be released in favor of relay 8SR1.

Moreover, operation of relay 8SR1 immediately opens conductor TS0 to concentrator 0 and causes relay 3S1 to release thereby dismissing the seizure of the concentrator control unit by concentrator 0 and permitting concentrator 1 to remain connected thereto. The contacts of relay 8SR1 perform a doubly advantageous function in this respect by causing the positive release of relay 3S1 which conceivably may otherwise remain operated by leakage current over conductor TS0 to concentrator 1. Again it will be seen that conductors TS1 and RS1 are connected to concentrator 1 at the contacts of relay 8G1 and conductor RS0 remains connected to concentrator 1 since relay 8G0 cannot now operate.

In short, in the event of precisely simultaneous seizure of the control unit by concentrators 0 and 1, the seizure by concentrator 0 will be nullified, the signaling connection thereto peremptorily severed and preference will be allocated to concentrator 1 until the connection to substation 00 thereat has been served at which time the common equipment in the control unit may release and seizure will be permitted of the control unit by concentrator 0 in response to the service request at substation 00 of that concentrator.

It is to be understood that the above-described arrangements are illustrative of the application of the principles of this invention. Numerous other arrangements may be devised by those skilled in the art without departing from the spirit and scope of the invention.

What is claimed is:

1. A universal telephone line concentrator system including a first and second plurality of lines, a telephone central office, first and second concentrator units remote from said office and from each other, a first group of trunks less in number than said first plurality of lines extending from said central office to said first remote concentrator unit, a second group of trunks less in number than said second plurality of lines extending from said central office to said second remote concentrator unit, switching means in said concentrator units for connecting said lines to said trunks under control of said central office, a control unit at said central office for coupling said trunks to said office, means in said control unit for governing said remote units on a space division basis including means effective upon the simultaneous occurrence of originating calls at both of said remote concentrator units for denying access to said control unit by a less preferred one of said remote units, and additional means in said control unit responsive to the simultaneous seizure of said control unit by both of said remote units for severing the connection to said less preferred unit.

2. A universal telephone line concentrator system including a first plurality of lines, a telephone central office, a second plurality of lines remote from said central office and from said first plurality of lines, a first plurality of trunks less in number than said first plurality of lines extending from said central office, a second plurality of trunks less in number than said second plurality of lines extending from said central office, first and second remote concentrator switching units for coupling said first plurality of lines to said first plurality of trunks and said second plurality of lines to said second plurality of trunks respectively under control of said telephone central office, a control unit at said central office for terminating and reexpanding said trunks to a number of terminations equal to the total of said first and second plurality of lines, a first signal circuit at said first remote concentrator unit, a second signal circuit at said second remote concentrator unit and a third signal circuit in said control unit, means for transmitting signal intelligence bidirectionally between said first and third signal circuits and between said second and third signal circuits, and additional means in said control unit responsive to the establishment of a connection between said first and third signal circuits for intelligence transmission to block the connection of said second signal circuit to said third signal circuit.

3. A remote line concentrator system including a first and second plurality of lines, a telephone central office, a first and second plurality of trunks extending from said office, a first concentrator network for coupling said first plurality of lines to said first plurality of trunks under control of said central office, a second concentrator network remote from said first concentrator network for coupling said second plurality of lines to said second plurality of trunks under control of said central office, a control unit at said central office for terminating and expanding said trunks, bistable devices in said control unit, said devices being individually representative of said networks, means in said control unit responsive to the simultaneous origination of a plurality of service request calls at said remote networks for energizing said bistable devices individually representative of said remote networks, and additional means in said control unit responsive to the simultaneous energization of said bistable devices for releasing a less preferred one of said devices.

4. An automatic telephone line concentrator system including a first plurality of substation lines, a telephone central office, a second plurality of substation lines remote from said first plurality, a first plurality and a second plurality of trunks extending from said central office, a first remote concentrator switching unit for connecting said first plurality of lines to said first plurality of trunks under control of said central office, a second remote concentrator switching unit for connecting said second plurality of lines to said second plurality of trunks under control of said central office, signal means at said remote units and at said central office for transmitting signaling information therebetween including marginal relay means and sensitive relay means, said marginal relay means being operative in response to a relatively high current signal condition, said sensitive means being operative responsive to a relatively low current signal condition, and means in said central office for coupling said signaling means in said first remote unit and said second remote unit to said signaling means in said central office including means responsive to the interconnection of said signal means in said first unit and said central office for blocking access by said signal means in said second remote unit to said signal means in said central office.

5. A universal telephone line concentrator system including a first plurality of lines, a central office, a second plurality of lines, a first and second plurality of trunks extending from said central office, a first concentrator switching unit for connecting said first plurality of trunks to said first plurality of lines under control of said central office, a second concentrator switching unit remote from said first switching unit for connecting said second plurality of trunks to said second plurality of lines under control of said central office, identifying means at said concentrator units responsive to an active condition on one of said lines for identifying said line, signal means responsive to said identifying means at said concentrator units for transmitting said line identifications to said central office, and means at said central office responsive to the simultaneous transmission of identification signals from said first and second concentrator units representing calling lines for interconnecting said first concentrator switching unit and said central office and for denying access by said second concentrator signal means to said central office.

6. A universal line concentrator system including a first plurality of substation lines, a telephone central office, a second plurality of substation lines, a first and second plurality of trunks extending from said central office, a first remote switching unit for connecting said first plurality of lines to said first plurality of trunks under control of said central office, a second remote switching unit remote from said first switching unit for connecting said second plurality of lines to said second plurality of trunks under control of said central office, a control switching unit in said central office for coupling said trunks to said office, means at said first remote switching unit and said second switching unit responsive to an active condition on one of said lines for identifying said line, means at said control unit responsive to a terminating call to one of said lines for identifying said line, signal means at said first and second remote units and at said control unit for transmitting said identification from said remote units to said central office on originating calls and for transmitting said identification on terminating calls from said control unit to said remote unit, and means at said control unit responsive to simultaneous originating calls at said first and second remote switching units for connecting said signal means of said first switching unit to said signal means of said control unit and for blocking access by said signal means of said second remote unit to said control unit signal means.

7. A universal telephone line concentrator system including a first plurality of lines, a second plurality of lines, a telephone central office, a first plurality of speech trunks and signal trunks extending from said office, a second plurality of speech trunks and signal trunks extending from said office, first remote switching means for connecting said first plurality of lines to said first plurality of speech trunks under control of said central office in response to signals transmitted over said first plurality of signal trunks, second remote switching means for connecting said second plurality of lines to said second plurality of speech trunks under control of signals transmitted over said second plurality of signal trunks, signal circuits at said remote switching means and said central office connectable to said signal trunks for bidirectional transmission of signal intelligence between each of said remote means and said central office, bistable devices in said central office individually representative of said remote means, means in said central office responsive to simultaneous originating calls appearing at said first and second remote switching means for activating said bistable devices, and additional means responsive to the simultaneous energization of both of said bistable devices for releasing one of said bistable devices including means for precluding access to said signal circuit in said central office by said signal circuit in a less preferred one of said means.

8. A universal telephone line concentrator system including a first plurality of telephone lines, a second plurality of telephone lines, a telephone central office, a first plurality of speech trunks extending from said office, a second plurality of signal trunks extending from said office, first and second remote switching means for connecting said lines to said trunks under control of said central office, control switching means in said office for terminating said trunks, identifying means including a first group of relays in said remote switching means indicative of a portion of a line identification on an originating call, a second group of relays in said remote switching means indicative of the remainder of said line identification, identifying means in said control switching means effective during a terminating call to one of said lines to identify said called line, signaling means in said remote switching means for transmitting said line identification to said office in response to the operation of said identifying means, said signaling means including means for applying currents of high intermediate and low levels to said signal trunks according to a code representative of said line identification, and means in said control switching means responsive to the simultaneous appearance of originating calls in both of said remote switching units for granting access to said signaling means of one of said remote switching units and denying access to the other.

9. A universal telephone line concentrator system including a first plurality of lines, a telephone central office, a second plurality of lines, a plurality of trunks in a first group extending from said office, a plurality of trunks in a second group extending from said office, first remote switching means for connecting said first plurality of lines to said first group of trunks under control of said central office, second remote switching means for connecting said second plurality of lines to said second group of trunks under control of said central office, said remote switching means including identifying means operative in response to an active condition on one of said lines for indicating the identification of said line including sensory means connected to said lines and operable for indicating the service condition thereof, a first group of bistable devices, a second group of bistable devices, means responsive to the operation of one of said sensory means for actuating a particular bistable device in said first group, and means jointly responsive to the operation of said sensory means and said bistable device in said first group to operate a particular bistable device in said second group, and control switching means in said central office for terminating said trunks including preference means responsive to a plurality of simultaneous calling conditions on said lines connected to said first remote switching means and said second remote switching means for preventing access to said control switching means by a less preferred one of said remote switching means, said preference means including bistable means individual to said first remote switching means and said second remote switching means.

10. A universal telephone line concentrator system including a first group of substation lines, a second group of substation lines, a telephone central office, a first plurality of trunks extending from said office, a second plurality of trunks extending from said office, first and second remote switching means for coupling said lines to said trunks under control of said central office, control switching means for connecting said trunks to said office, identifying means in said remote switching means responsive to an originating call on one of said lines to indicate the identification of said calling line, identifying means in said control switching means responsive to a terminating call to one of said lines to indicate the identification of said called lines, said identifying means including a first group of bistable devices and a second group of bistable devices, means connecting said first group in a lockout chain, means connecting said second group in a lockout chain, means for operating a particular bistable device in said first group and a bistable device in said second group to uniquely designate a calling line, means in said control switching means responsive to the energization of a plurality of simultaneous originating calling conditions on said lines in said first and second remote switching means for precluding access to said control switching means by a less preferred one of said remote switching means including relay means individual to said first and second remote switching means, and additional means responsive to the operation of a first of said relay means for precluding the operation of the other of said relay means.

11. A universal telephone line concentrator system including a first plurality of substation lines, a second plurality of substation lines, a telephone central office, a first plurality of trunks fewer in number than said lines, a second plurality of trunks fewer in number than said lines, first remote switching means for coupling said first plurality of lines to said first plurality of trunks under control of said central office, second remote switching means for connecting said second plurality of lines to said second plurality of trunks under control of said central office, said trunks including a first signal pair and a second signal pair, means at said remote switching means for transmitting line identification information over said first signal pair, control switching means at said central office for coupling said trunks to said office, means in said control switching means for transmitting line and trunk identification information over said first and second signal pairs, means in said control switching means responsive to a plurality of simultaneous calling conditions on said lines in said first and second remote switching means for precluding access to a less preferred one of said remote switching means including bistable means individual to said first and second remote switching means, and additional means responsive to the operation of said bistable means for divorcing said signal pairs connected to a less preferred one of said remote switching means from said control switching means.

12. A remote line concentrator system including a first and second plurality of lines, a telephone central office, a first and second plurality of speech trunks extending from said office, first and second remote switching means remotely located from each other for connecting said first plurality of lines to said first plurality of trunks and for connecting said second plurality of lines to said second plurality of trunks under control of said central office, first and second bistable devices in said central office arranged in preference lockout chains wherein each of said bistable devices in each of said chains represents a particular class of call connection, means for arranging said chains in inverse orders of preference, means responsive to an originating call in one of said remote switching means for operating a first bistable device in a first of said chains and a corresponding bistable device in a second of said chains, and means responsive to a subsequent originating call at said other remote switching unit for precluding the operation of said corresponding bistable device in said first and second chains.

13. A universal telephone line concentrator system including a first and second plurality of lines, a telephone central office, a first and second plurality of trunks extending from said office, first and second switching means remote from said office and from each other for connecting said first plurality of lines to said first plurality of trunks and said second plurality of lines to said second plurality of trunks, respectively under control of said central office, control switching means at said central office for connecting said trunks to said office, first and second relay means in said control switching means, said relay means being individually representative of said first and second remote switching means respectively, means responsive to a calling condition in said first switching means for operating said first relay means to preclude the subsequent operation of said second relay means, means responsive to a calling condition at said second switching means for operating said second relay means to preclude the subsequent operation of said first relay means, and means responsive to simultaneous originating calls at said first and second switching means for operating said first and second relay means simultaneously including means for thereafter releasing said second relay means and denying access by said second remote switching means to said control switching means.

14. A universal telephone line concentrator system including a first plurality of substation lines, a second plurality of substation lines, a telephone central office, a first plurality of trunks and a second plurality of trunks fewer in number than said lines extending from said office, control switching means at said office for connecting said trunks to said office, first and second switching means remote from said office and from each other for connecting said first plurality of lines to said first plurality of trunks and said second plurality of lines to said second plurality of trunks under control of said central office, means in said control switching means responsive to a plurality of simultaneous calling conditions on said lines in said first and second remote switching means for divorcing an established connection between said second remote switching means and said central office including first and second relay means individual to said remote switching means, a first chain of bistable devices including devices individual to said remote switching means, a second chain of bistable devices including devices individual to said remote switching means, means for operating said first and second relay means in response to said simultaneous calling conditions, means responsive to the operation of said relay means for operating said devices in said first chain, means responsive to the operation of said devices in said first chain for operating said devices in said second chain, and means responsive to the operation of said devices in said second chain for releasing one of said devices in said first chain individual to said second switching means and for releasing said second relay means.

15. A universal telephone line concentrator system including a first and second plurality of substation lines, a telephone central office, a first plurality of speech trunks and a first plurality of signal trunks extending from said office, a second plurality of speech trunks and a second plurality of signal trunks extending from said office, first and second switching means remote from said office and remote from each other for connecting said first plurality of speech trunks to said first plurality of lines in response to signals over said first plurality of signal trunks and for connecting said second plurality of speech trunks to said second plurality of lines in response to signals over said second plurality of signal trunks respectively, control switching means at said central office for connecting said trunks to said office, and preference means in said control switching means responsive to a plurality of simultaneous calling conditions on said lines in said first and second switching means for connecting said control switching means over said signal trunks to said first switching means and for divorcing said control switching means from said second plurality of signal trunks, said preference means further including means responsive to the establishment of a connection over one of said speech trunks in said first plurality of speech trunks in response to said calling condition at said first switching means to establish a connection between said control switching means and said second switching means over said second plurality of signal trunks.

16. A universal telephone line concentrator system in accordance with claim 15 including in addition means in said preference means responsive to precisely simultaneous originating conditions on said substation lines in said first and second switching means for temporarily connecting said control switching means to said first and second pluralities of signal trunks and for subsequently divorcing said second plurality of signal trunks from said control switching means, and means for introducing a temporary infinite impedance in series with said second plurality of signal trunks prior to said divorcing of said second plurality of signal trunks from said control switching means.

17. A universal telephone line concentrator system in accordance with claim 15 including in addition first and second individual bistable means in said preference means representative of said first and second remote switching means, and release means responsive to the operation of said first and second bistable means precisely simultaneously to release said second bistable means.

18. A universal telephone line concentrator system in accordance with claim 17 including in addition third and fourth bistable means responsive to the operation of said first and second bistable means respectively, and wherein said release means includes means serially connected to said second bistable means and responsive to the attempted operation of said third and fourth bistable means for releasing said second bistable means.

References Cited in the file of this patent

UNITED STATES PATENTS 2,976,367 Bruce et al. ____________ Mar. 21, 1961